(12) United States Patent
Van Schyndel

(10) Patent No.: US 6,775,631 B2
(45) Date of Patent: Aug. 10, 2004

(54) POST DETECTION CHROMATIC DISPERSION COMPENSATION

(75) Inventor: Andre Van Schyndel, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/022,666

(22) Filed: Dec. 17, 2001

(65) Prior Publication Data

US 2003/0115006 A1 Jun. 19, 2003

(51) Int. Cl.[7] ........................... G06F 19/00; H04B 10/00
(52) U.S. Cl. ........................................ 702/85; 398/158
(58) Field of Search ............................. 702/85; 385/4; 398/158; 359/237

(56) References Cited

U.S. PATENT DOCUMENTS

| | | | | |
|---|---|---|---|---|
| 5,638,439 A | * | 6/1997 | Kawada et al. | ............. 379/411 |
| 5,949,926 A | * | 9/1999 | Davies | .......................... 385/3 |
| 6,388,785 B2 | * | 5/2002 | Havstad et al. | ............. 398/158 |
| 6,487,352 B1 | * | 11/2002 | Sobiski et al. | ............. 385/122 |
| 6,522,439 B2 | * | 2/2003 | Price et al. | ................. 398/194 |
| 6,633,704 B2 | * | 10/2003 | Kohnke et al. | ............... 385/39 |

FOREIGN PATENT DOCUMENTS

| DE | 19913374 A1 | 3/1999 |
|---|---|---|
| EP | 0954126 A | 3/1999 |
| EP | 0912001 A | 4/1999 |

OTHER PUBLICATIONS

"A Fiber Chromatic Dispersion Compensation Technique with an Optical SSB Transmission in Optical Homodyne Detection System", Yonenaga et al., 1993, IEEE Photonics Technology Letters, vol. 5, Issue 8, pp. 949–951.*

"Overcoming Chromatic–Dispersion Effects in Fiber–Wireless Systems Incorporating External Modulators", Smith et al., IEEE Transactions on Microwave Theory and Techniques, vol. 45, No. 8, Aug. 1997.*

Sven Otte, Werner Rosenkranz, A Decision Feeback Equalizer For Dispersion Compensation in High Speed Optical . . . .

A. Royset, L. Bjerkan and A.Sv. Sudbo, Compensation of Optical Fibre Dispersion In the Electrical Domain . . . .

Fianmin Wang and Klauss Petermann, Small Signal Analysis for Dispersive Optical Fiber Communication Systems.

Jack H. Winters, and Richard D. Gitlin, Electrical Signal Processing Techniques in Long–Haul Fiber–Optic . . . .

Jack H. Winters, Equalization in Coherent Lightwave Systems Using a Fractionally Spaced Equalizer.

Mike Sieben, Jan Conradi and David E. Dodds, Optical Single Sideband Transmission at 10 Gb/s Using . . . .

Pfeiffer T. et al.: "High–Speed Transmission of Broad–Band Thermal Light Pulses Over Dispersive Fibers", IEEE Photonics Technology Letters, Mar. 3, 1999, pp. 385–387, vol. 11, No. 3, IEEE Inc., New York, US.

(List continued on next page.)

Primary Examiner—John Barlow
Assistant Examiner—Toan M. Le
(74) Attorney, Agent, or Firm—Mintz, Levin, Cohn, Ferris, Glovsky and Popeo, P.C.

(57) ABSTRACT

A method and apparatus for compensating, in the electrical domain, for chromatic dispersion of an optical signal is disclosed. A received optical signal is converted to an electrical signal. The spectrum of the electrical signal is amplified by a factor derived from its frequency; and the phase of regions of said spectrum is selectively inverted to thereby allow recovery of the transmitted data.

The optical signal may have a non-infinite extinction ratio to improve recovery of the transmitted signal. The square root of the electrical signal may be taken to improve recovery of the transmitted signal.

18 Claims, 6 Drawing Sheets

OTHER PUBLICATIONS

Witte M. et al.: "Reducing the Optical Power Penalty for Electronically Dispersion Compensated LED Pulse Transmission by Using Multi–Bit Shift Decision Feedback", Electronics Letters, Mar. 2, 2000, pp. 450–451, vol. 36, No. 5, IEE Stevenage, GB.

Sven Otte, Werner Rosenkrans, A Decision Feedback Equalizer For Dispersion Compensation in High Speed Optical Transmission System.

* cited by examiner

POST DETECTION CHROMATIC DISPERSION COMPENSATION

This invention relates to chromatic dispersion compensation, but more particularly to compensation of chromatic dispersion which is performed post detection in the electrical domain.

BACKGROUND OF THE INVENTION

With the advent of optical amplifiers, which can compensate for fibre loss, the reach of fiber systems, especially at 10 Gb/s and beyond, is limited by chromatic dispersion. Chromatic dispersion causes different parts of the signal spectrum to arrive at the distant end of the system at different times. An optical signal carrying information has a bandwidth spread related to the modulation of the optical carrier.

In the time domain, the dispersion can cause pulses to interfere with each other. This is known as inter-symbol interference or ISI. The dominant cause of chromatic dispersion is material dispersion, the variation in the refractive index versus wavelength of silica, the basic material from which all low loss transmission fibers are made. Ideally, chromatic dispersion is a reversible process. Optical dispersion compensation requires an element, which can produce a delay versus frequency characteristic equal and opposite to that of the fiber. It may be optically compensated either by using special dispersion shifted transmission fiber in the transmission path or by localized dispersion compensation. In the case of the dispersion shifted transmission fiber, a length of this highly dispersive fiber is inserted between the end of the channel and a PIN diode detector to add a frequency dependent delay opposite to that applied by the fiber in the channel. Unfortunately, the problem with this method is that it also introduces attenuation, it requires complex measurements and trained personnel for installation and is not adjustable once installed. Other methods include stretchable chirped Fiber Bragg Gratings (FBGs), Arrayed Waveguide Gratings (AWGs) and tunable Fabry Perot interferometers. Unfortunately, these methods have limited bandwidths, demand higher power levels, have slow and limited adaptation and are expensive.

Although efforts have been made to develop fully optical networks including photonic switching devices, the effects caused by chromatic dispersion and the solutions used to date have hampered their introduction since compensating devices have to be tailored to the specific length of fiber channel being used. Any changes due to network re-configuration or other changes require additional measurements and re-installation of chromatic dispersion compensating equipment.

A need therefore exists for a chromatic dispersion compensation process, which overcomes the shortcomings associated with the current compensation methods.

SUMMARY OF THE INVENTION

According to a first aspect of the invention, there is provided a method and apparatus for compensating, in the electrical domain, for chromatic dispersion of an optical signal. The received optical signal is converted to an electrical signal. The spectrum of the electrical signal is amplified by a factor derived from its frequency; and the phase of regions of the spectrum is selectively inverted to thereby allow recovery of the transmitted data.

According to another aspect of the invention, the optical signal has a non-infinite extinction ratio. The square root of the electrical signal may be taken prior to the application of the transfer function to improve recovery of the transmitted signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention and its embodiments thereof will be described in conjunction with the accompanying drawings in which.

DETAILED DESCRIPTION OF THE PREFERRED EMBODIMENT

Figure 1:
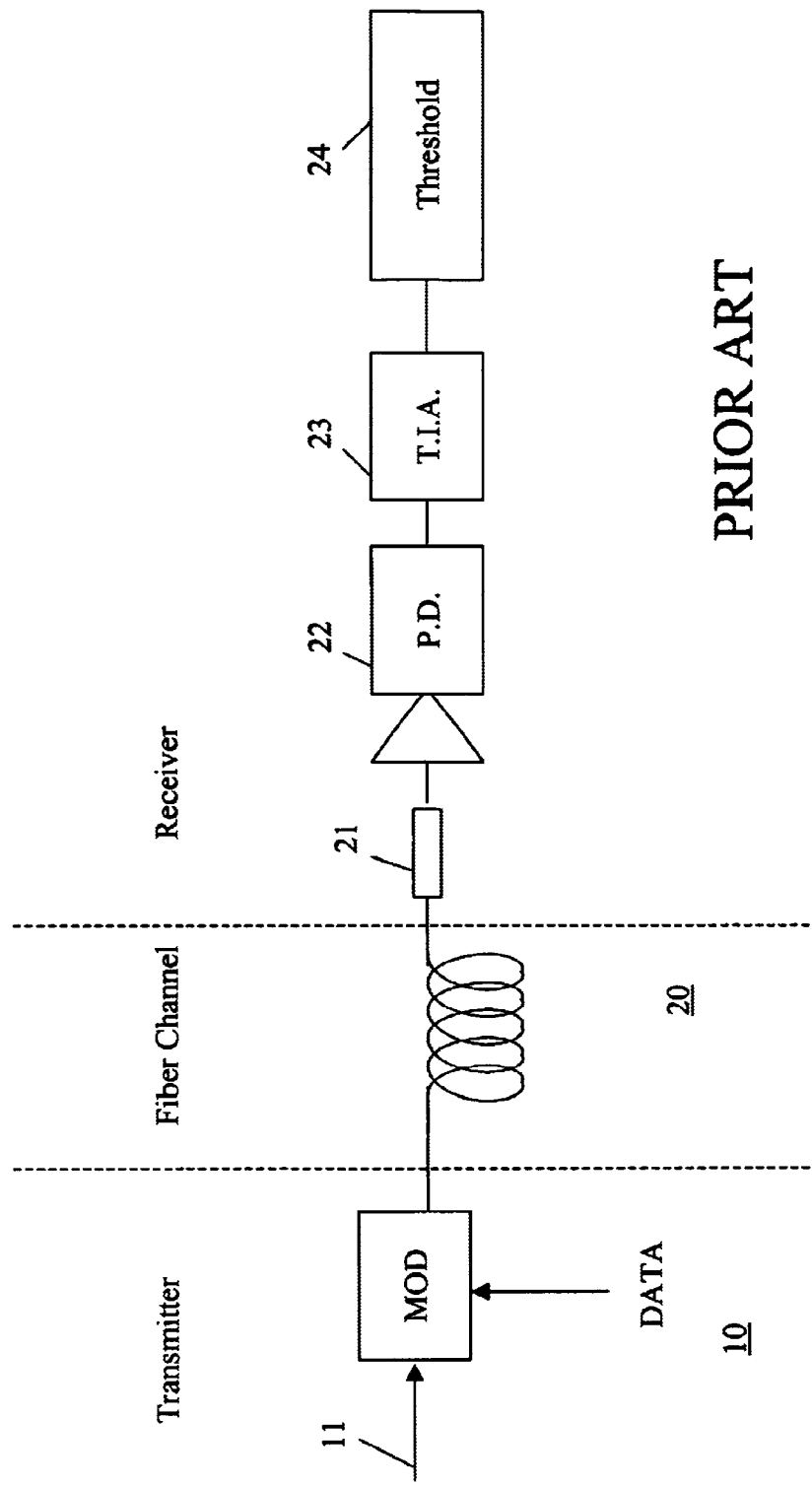
FIG. 1 is a block diagram illustrating a chromatic dispersion compensation technique used in the prior art.

Referring now to FIG. 1, we have shown a block diagram illustrating a method of compensating for chromatic dispersion in the optical domain, as used in the prior art. At the transmitter end 10, the output 11 of a laser (not shown) is modulated by incoming data for transmission through a fiber channel 20. As described earlier, with the optical signal passing through the fiber medium, chromatic dispersion introduces a frequency dependent delay on the signal. This dispersion makes the received signal much harder to detect once dispersion delay becomes comparable to the bit period.

The most common dispersion compensation technique is to use a dispersion compensation fiber 21. A length of this highly dispersive fiber is inserted at the receiving end, between the end of channel 20 and an optical amplifier, if needed, and power detector 22. The purpose of the dispersive fiber is to add frequency dependent delay opposite to that applied by the fiber in the channel 20. The power detector 22 is then followed by a Trans-Impedance Amplifier (TIA) 23 and a threshold detector 24 before the signal is further distributed to its expected destination. Unfortunately, as indicated previously, the use of a dispersive fiber introduces attenuation and does not have the capability of adjusting the dispersion compensation once installed.

Figure 2:
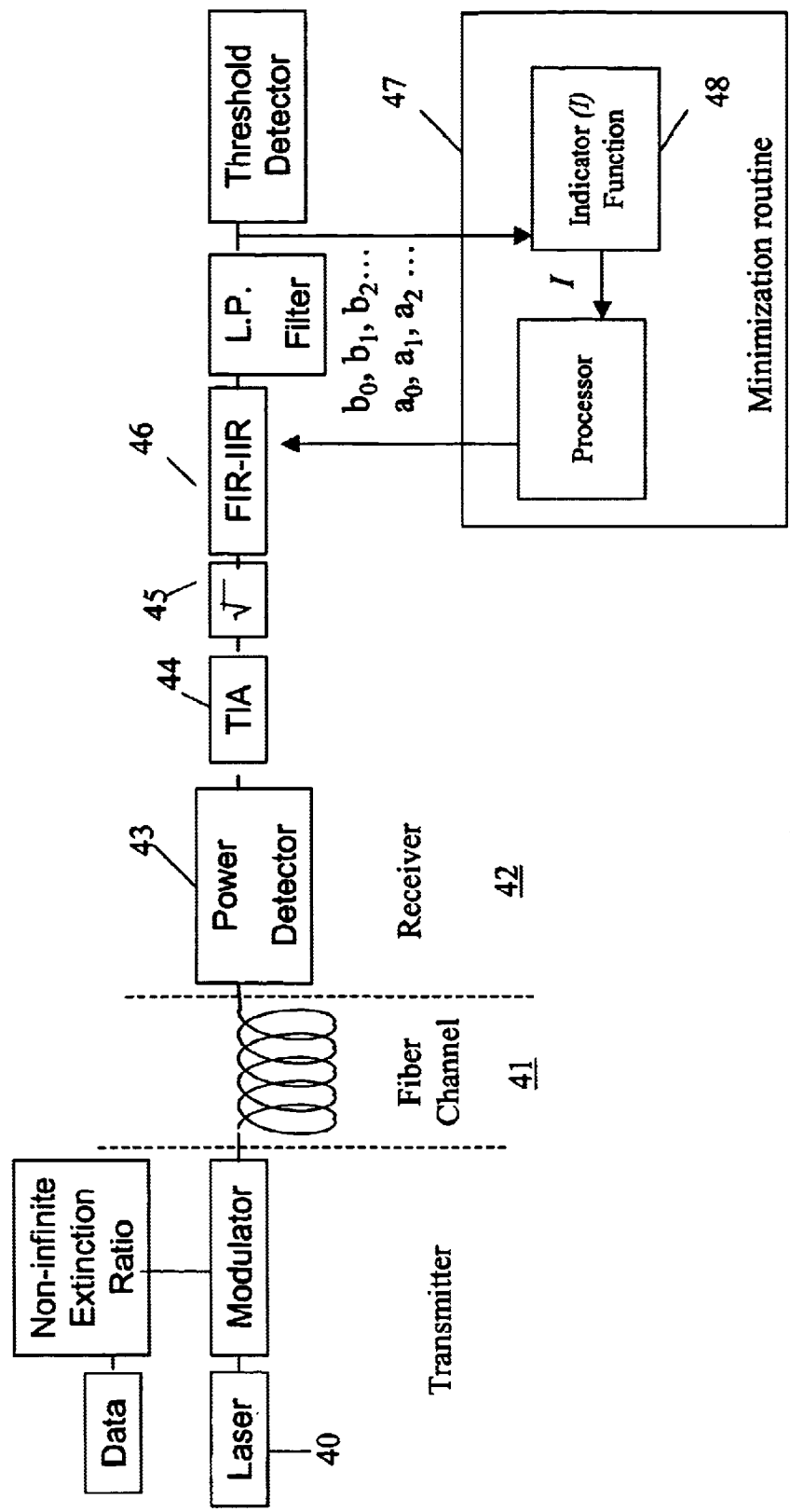
FIG. 2 is a block diagram illustrating the chromatic dispersion compensation technique of the present invention.

As shown in FIG. 2, the chromatic compensation technique of the present invention compensates for chromatic dispersion in the electrical domain rather than in the optical domain. That is, the compensation is done post detection rather than before the received signal is passed through the power detector. This eliminates the need to use highly dispersive fibers, which can be difficult to tune and install. More importantly, because this technique can be quickly adjusted to compensate for changing dispersion, it enables the use of photonic switches which can re-direct signals to fiber channels having different chromatic dispersion characteristics. As before, data to be transmitted modulates the output of laser 40 before being sent over the fiber channel 41. However, at the receiver 42, the received optical signal is converted to an electrical signal by means of a power detector 43 and TIA 44. The power detector 43 can be a PIN detector, avalanche detector, etc. Other types of power detectors may be used without changing the scope of the present invention. The transmitted data can be recovered from the electrical signal by applying a square root function 45 and a Finite Impulse Response Infinite Impulse Response (FIR-IIR) filter, also called Auto Regressive Moving Average (ARMA) filter 46. As will be described further below, the coefficient set for a particular (DL) is calculated from a transfer function. This is done for a range of lengths and can be stored in memory for use later by the FIR-IIR filter. If there is a need to determine the amount of dispersion on the channel, for example upon startup, reconfiguration of the optical channel, etc. a minimization routine 47 using an indicator I shown as 48 can be used to select the appropriate set of coefficients for the filter 46.

In order to derive the solution illustrated in FIG. 2, we can identify that in a typical optical transmission network, the optical signal is an amplitude modulated signal prior to detection by the power detector. The spectrum of this signal contains a "carrier" at a typical laser frequency (e.g. 193 THz for 1550 nm laser light) surrounded by upper and lower sidebands. As the signal traverses the fiber, the higher frequencies travel faster than the lower frequencies (negative slopes are common too), causing the higher frequency components to have a shorter optical path than the lower frequencies. The amount of delay relative to the optical carrier that each frequency component experiences is expressed by:

$$\tau = DL \frac{\lambda_0^2}{c}(f - f_c) \tag{1}$$

wherein

D is the dispersion
L is the length of the fiber
$\lambda_0$ is the wavelength of the light source
c is the speed of light
$f_c$ is the frequency of the laser light carrier
f is the frequency of the Fourier component The propagation through the optical fiber can be described by the propagation term $e^{j\beta L}$ with $\beta = \pi \tau f$. To describe the effects of dispersion, each Fourier term is multiplied by the relative phase factor:

$$\exp\left[j\pi DL \frac{\lambda_0^2}{c}(f - f_c)^2\right] \tag{2}$$

This is the phase factor that the prior art optical dispersion compensation methods nullify in the optical domain. Note that the magnitude of the phase factor is unity, which means that traversing a fiber with this idealized chromatic dispersion has no effect on the power spectrum of the optical signal.

The power detector illustrated in FIG. 1 usually comprises an instantaneous power detector followed by a low pass filter. This acts as a time domain envelope power detector, i.e., the output is the average power of the optical signal at that particular time. The output is usually band limited to a frequency comparable to the bit rate. Generally only the data for a particular WDM wavelength is present at detection (the others being filtered off by WDM bandpass filters).

Among other things, each Fourier component of the detected signal contains the power represented by the linear sum of the positive and negative sidebands of the original signal. The square root (the power would represent the square of the electric field) of this sum is:

$$\exp\left[j\pi DL\frac{\lambda_0^2}{c}f^2\right] + \exp\left[-j\pi DL\frac{\lambda_0^2}{c}f^2\right] = 2\cos\left[\pi DL\frac{\lambda_0^2}{c}f^2\right]$$

This is true as long as the time domain signal does not go negative (inverting the phase of the carrier). With the post detection chromatic dispersion compensation of the present invention, it was formulated that this can be prevented in practice by modulating the data with an extinction ratio that is low enough to accommodate any negative swings in the dispersed time domain signal. (The extinction ratio is the ratio of the 'on' optical power to the 'off' optical power.) Furthermore, the approximation gets better as the extinction ratio is reduced.

It was then formulated that to some extent, one can retrieve the Fourier transform of the original signal by dividing the Fourier transform of the detected signal by the sum calculated above, or equivalently, multiplying by the transfer function:

$$\sec\left[\pi DL \frac{\lambda_0^2}{c} f^2\right] \tag{3}$$

Greater benefit from the technique can be derived by modifying the electrical signal with the introduction of a non-linear element prior to application of the transfer function. A non-linear element that would provide such a benefit is a square root function. Equation 3 describes amplification of parts of the spectrum of the electrical signal by a factor derived from its frequency and the selective phase inversion of regions of the spectrum of the electrical signal.

The sec function goes to infinity at $$\frac{\pi}{2} + n\pi$$

where n is an integer. In practice, one would cap the size of the sec function perhaps to a value comparable to the signal to noise ratio. The parts of the spectrum within these capped regions would not be easily retrievable.

Figure 3:
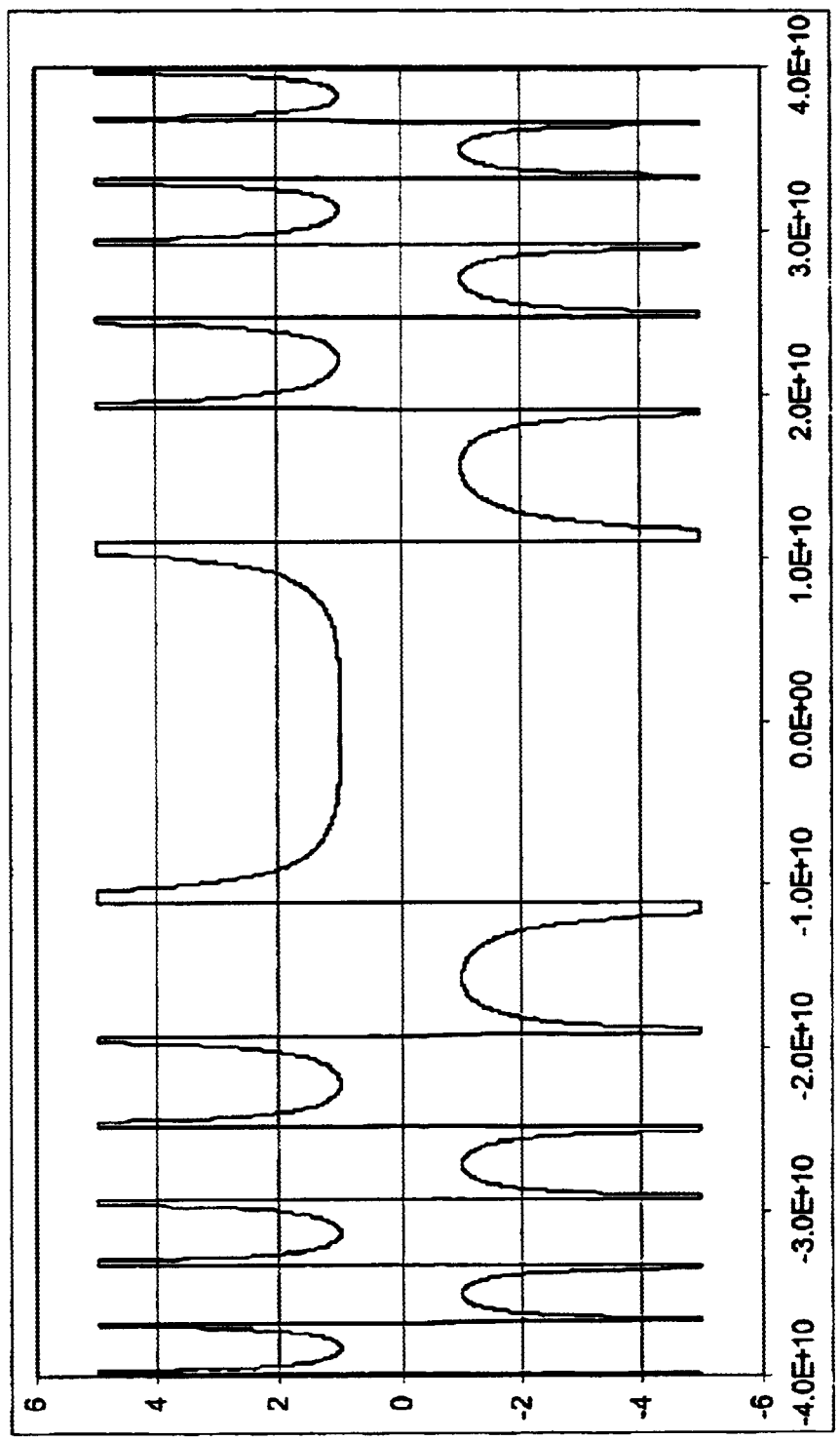
FIG. 3 is a diagram of the transfer function used for recovering the transmitted signal according to the preferred embodiment of the present invention.

An example of this transfer function for a dispersion of 17 ps/nm/km over a length of 30 km is shown in FIG. 3. The transfer function shown need only be reproduced out to a limited frequency. For 10 GB/s, the transfer function need only extend from approximately −8 GHz to +8 GHz. In FIG. 3, it is seen that the value of the transfer function is essentially one in this range, and would not have much effect. For 40 GB/s, the transfer function of FIG. 3 would be applied from approximately −32 GHz to +32 GHz incorporating many active parts of the transfer function.

Although there may be situations where this is not required, in the best mode, the transfer function is applied to a signal transmitted with a non-infinite extinction ratio. The extinction ratio should be at least small enough so that dispersive effects expressed as the amplitude of the optical electric field in the fiber do not change sign.

Figure 4A:
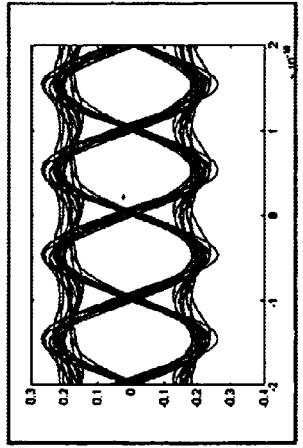
FIGS. 4a and 4b are illustrations of eye diagrams for uncompensated and compensated received data signals respectively.
Figure 4B:
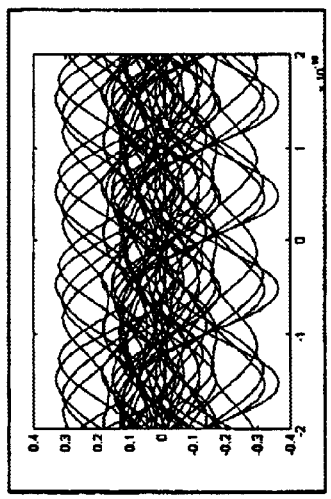

An example of the benefits of using the transfer function of FIG. 3 is illustrated by comparing the eye diagrams of FIGS. 4a and 4b. In FIG. 4a, we have shown an illustration of uncompensated data in the form of an eye diagram. This eye diagram represents the effects of chromatic dispersion on data at a distance of 300 km for a bit rate of 10 Gb/s with a 17 ps/nm/km fiber. This level of distortion makes the recovery of a signal at this distance essentially impossible unless chromatic dispersion compensation is put in place. In fact, at 10 GB/s with a fiber of 17 ps/nm/km, once the fiber length reaches about 120 km (when derived from Equation 1 this corresponds to a delay of 1.3 bit periods for the maximum frequencies in the modulation signal) reproduction of the transmitted signal becomes unmanageable.

FIG. 4b shows a recovered data eye diagram when the transfer function of Equation 3 is applied to the received signal. Application of the transfer function of Equation 3 results in a usable bit-error-rate (BER).

Figure 4C:
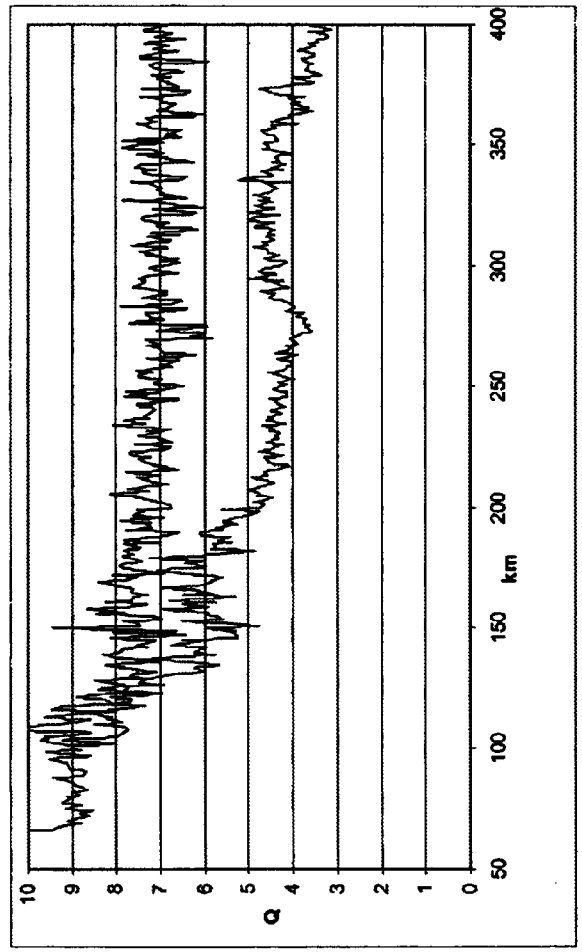
FIG. 4c is a chart of the Q versus distance.

FIG. 4c shows the results of a simulation that predicts the Q of the signal recovered using a $4^{th}$ order FIR-IIR filter on dispersion impaired signals. In this chart, the Q was determined every km from 50–400 km under the following conditions:

| | |
|---|---|
| Number of bits: | 1024 |
| Samples per bit | 16 |
| Bit rate: | 10 GB/s |
| Fiber dispersion: | 17 ps/nm/km |
| Optical level at the PIN detector: | −10 dBm |
| Noise in the receiver: | 12 pA/rt.Hz |
| Extinction Ratio: | 8 dB |
| Detector: | simple threshold |

The upper curve is the result of applying the transfer function in Equation 3, the lower curve represents the result of applying a FIR-IIR filter. The coefficients can be optimized further resulting in a higher Q. The Bit-Error-Rate (BER) is related to Q as illustrated in the following equation:

$$BER = \tfrac{1}{2}\, erfc\, (Q/\sqrt{2}) \qquad (4)$$

Figure 5:
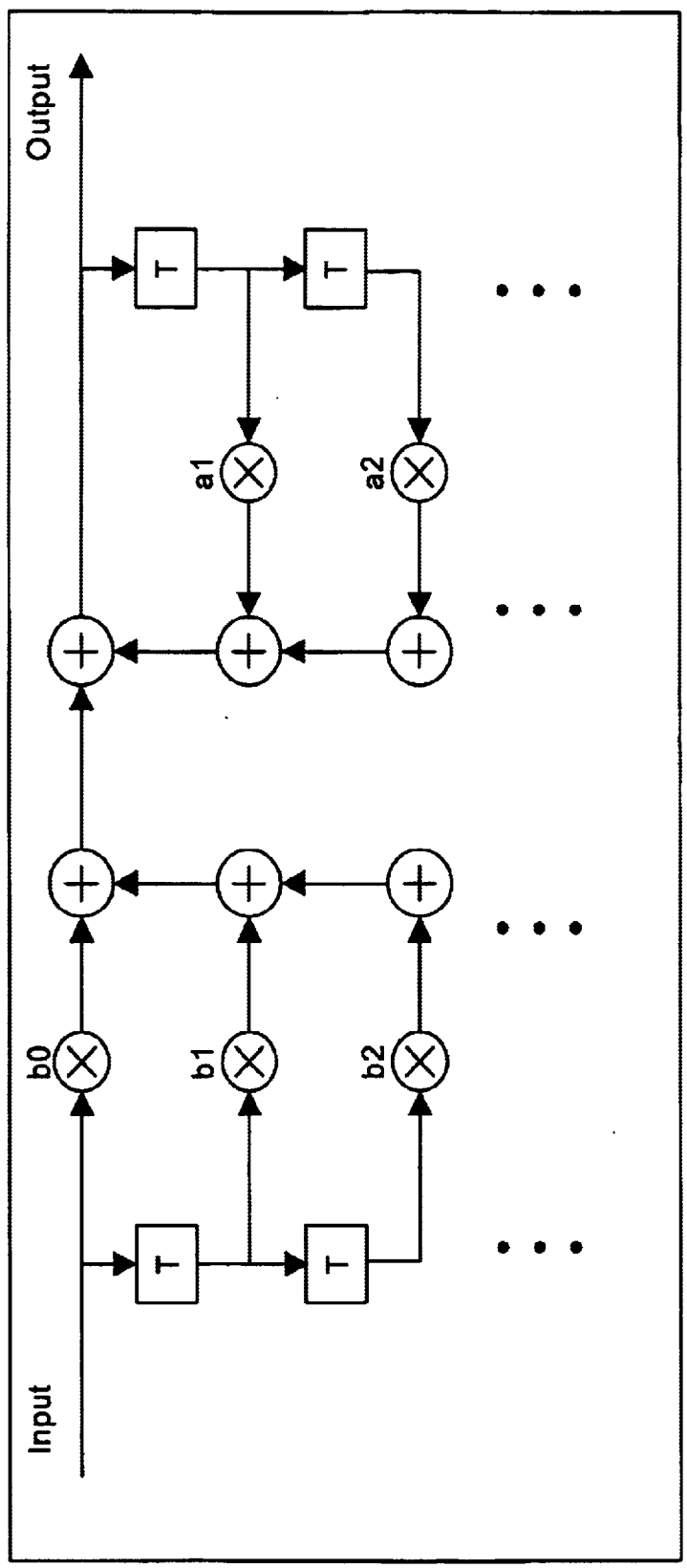
FIG. 5 is a block diagram illustrating a hardware implementation of the transfer function of FIG. 3 according to a preferred embodiment of the present invention.

The transfer function in the form of a FIR-IIR filter can be implemented by the circuit topology shown in FIG. 5. Using half bit delays in this implementation with 5 FIR taps and 4 IIR taps, viable BER can be achieved beyond 400 km. The effective transfer function applied by the circuit topology of FIG. 5 is given in Equation 5.

$$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}} \qquad (5)$$

The frequency response can be obtained by setting $z = e^{2\pi i f}$ (where $j = \sqrt{-1}$) and then directly compared to Equation 3. The filter coefficients (a's and b's) should be adjusted such that the function of frequency given by Equation 5 closely matches that of Equation 3. Those skilled in the art will recognize that a number of techniques can be used to achieve an appropriate match.

If the dispersion characteristics in a channel were not known, the secant argument in Equation (3) would also be unknown and recovery would not be feasible. For example, if a new fiber channel is installed or modified or if a signal is switched over to a new fiber network topology, the chromatic dispersion must be derived in order to properly compensate its effect. If the dispersion were incorrect, the peaks in the secant function would multiply parts of the spectrum that would not have the corresponding nulls from the sideband interference. This would produce large components of sinusoids at those frequencies. This suggests that the time averaged excursion of the signal from its mean value would be an indicator of the proper secant argument. If the indicator value is given by I, and the analog signal after application of the transfer function assuming a value of DL is x(t):

$$I(DL) = <|x(t) - \overline{x(t)}|> \qquad (6)$$

Figure 7:
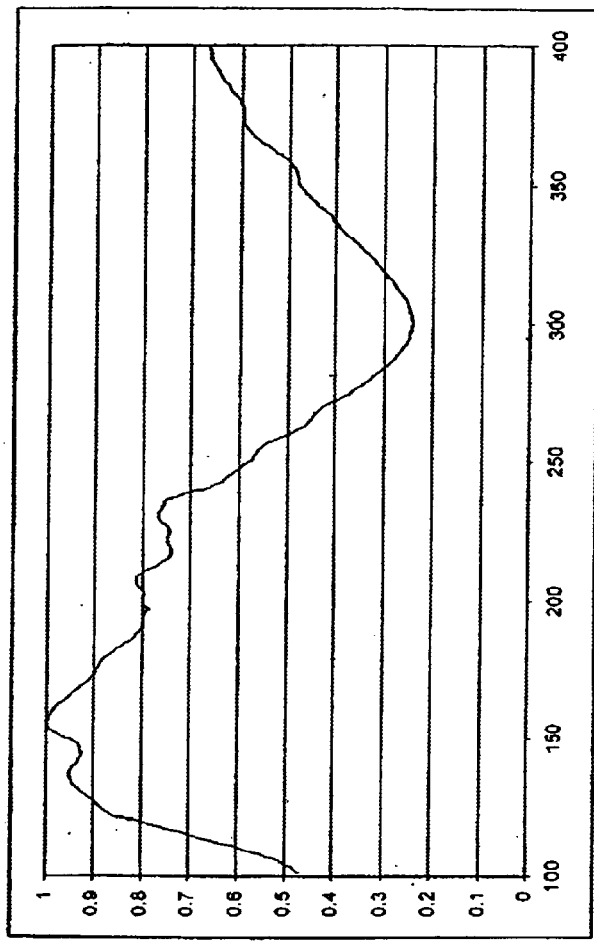
FIG. 7 is a graph illustrating the values of the Indicator I(DL) for various coefficient sets with actual dispersion at 300 km.
Figure 6:
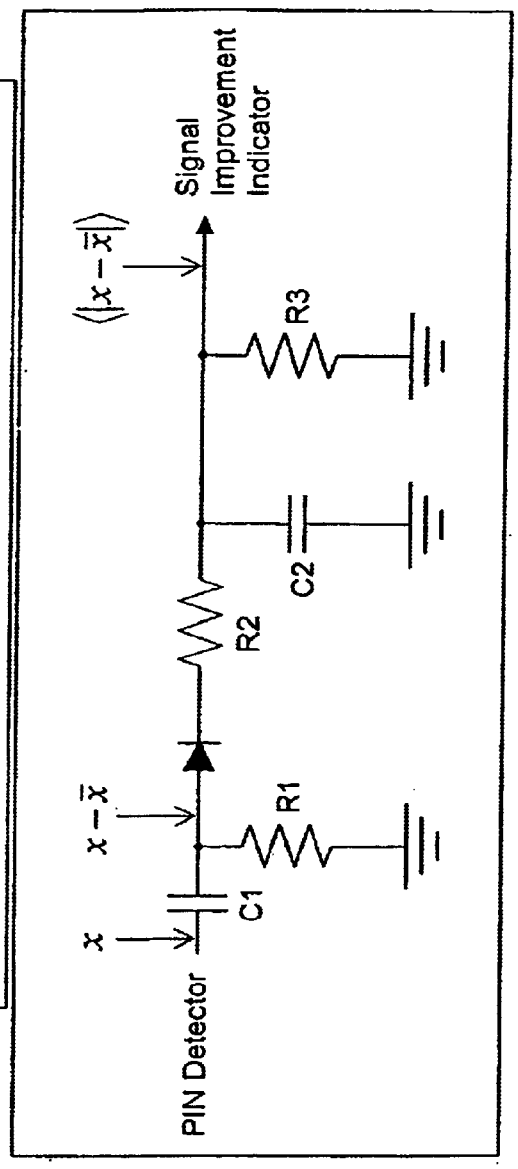
FIG. 6 is a simplified circuit for providing the Indicator I(DL)

This is relatively easy to implement as illustrated by the circuit topology of an indicator (I) circuit shown in FIG. 6. At the proper value of the argument, the indicator goes to a minimum (i.e. when DL in Equation 3 becomes equal to the product of the length of fiber in the channel (L) and the fiber dispersion (D)) Values of the indicator for various coefficients sets are plotted in FIG. 7. The coefficients are plotted as appropriate for various lengths of 17 ps/nm/km fiber. The data actually traversed 300 kms of 17 ps/nm/km fiber. Therefore, by scrolling through coefficient sets appropriate for various values of DL, the actual DL can be determined by minimizing the value of the indicator. This, in turn determines an appropriate set of coefficients to use for the dispersion compensation. Another advantage of using the minimization routine described above is that it can also be used as a diagnostic tool, i.e. the technique can be used for measuring chromatic dispersion. For example, testing spools of fiber once they leave the factory would determine the chromatic dispersion characteristics of the fiber.

It will be well known to those knowledgeable in the art that the embodiments presented above can be implemented in software.

I claim:

1. A method of compensating, in the electrical domain, for chromatic dispersion of an amplitude modulated optical double sideband signal, comprising the steps of:

a) converting said amplitude modulated optical double sideband signal to an electrical signal;

b) amplifying parts of the spectrum of said electrical signal by a factor derived from its frequency; and c) selectively inverting the phase of regions of said spectrum to thereby allow recovery of the transmitted data.

2. A method as defined in claim 1, wherein said step of amplifying and selectively inverting is described by a transfer function represented by $$\sec\!\left[\pi DL \frac{\lambda_0^2}{c} f^2\right]$$

where

D is the dispersion

L is the length of the fiber $\lambda_0$ is the wavelength of the light source c is the speed of light f is the frequency of the Fourier component.

3. A method as defined in claim 2, wherein said optical signal comprises a non-infinite extinction ratio.

4. A method as defined in claim 3, further comprising the step of modifying said electrical signal by introducing a non-linear element prior to application of said transfer function.

5. A method as defined in claim 4, wherein said non-linear element provides a square root of said electrical signal.

6. A method as defined in claim 3, wherein said non-infinite extinction ratio is present in said optical signal prior to transmission.

7. A method as defined in claim 2, wherein said transfer function is implemented by means of an FIR-IIR filter.

8. A method as defined in claim 1, wherein said compensation method is implemented in software.

9. A method as defined in claim 2, wherein said transfer function is used as a diagnostic tool for measuring the chromatic dispersion characteristics of an optical channel.

10. An apparatus for compensating, in the electric domain, for chromatic dispersion of an amplitude modulated optical double sideband signal, comprising:
   a) signal conversion means for converting said amplitude modulated optical double sideband signal to an electrical signal;
   b) means for amplifying parts of the spectrum of said electrical signal by a factor derived from its frequency; and
   c) means for selectively inverting the phase of regions of said spectrum to thereby allow recovery of the transmitted data.

11. An apparatus as defined in claim 9, wherein said means for amplifying and means for selectively inverting comprises means for applying a transfer function, wherein said transfer function being represented by $$\sec\left[\pi DL \frac{\lambda_0^2}{c} f^2\right]$$

where

D is the dispersion

L is the length of the fiber $\lambda_0$ is the wavelength of the light source c is the speed of light f is the frequency of the Fourier component.

12. An apparatus as defined in claim 10, wherein said optical signal comprises a non-infinite extinction ratio.

13. An apparatus as defined in claim 10, further comprising means for modifying said electrical signal by introducing a non-linear element prior to application of said transfer function.

14. An apparatus as defined in claim 13, wherein said non-linear element provides a square root of said electrical signal.

15. An apparatus as defined in claim 12, wherein said non-infinite extinction ratio is present in said optical signal prior to transmission.

16. An apparatus as defined in claim 10, wherein said transfer function is implemented by means of an FIR-IIR filter.

17. An apparatus as defined in claim 10, wherein said apparatus is implemented in software.

18. An apparatus as defined in claim 10, wherein said transfer function is used as a diagnostic tool for measuring the chromatic dispersion characteristics of an optical channel.

* * * * *